(12) United States Patent
Park et al.

(10) Patent No.: US 9,608,267 B2
(45) Date of Patent: *Mar. 28, 2017

(54) PRECURSOR FOR PREPARING OF LITHIUM COMPOSITE TRANSITION METAL OXIDE

(71) Applicant: LG Chem, Ltd., Seoul (KR)

(72) Inventors: Byung Chun Park, Daejeon (KR);
Seong Hoon Kang, Daejeon (KR);
Minsuk Kang, Daejeon (KR); Wang Mo Jung, Daejeon (KR); Ho Suk Shin, Daejeon (KR); Sang Min Park, Daejeon (KR); Geungi Min, Daejeon (KR)

(73) Assignee: LG Chem, Ltd. (KR)

( * ) Notice: Subject to any disclaimer, the term of this patent is extended or adjusted under 35 U.S.C. 154(b) by 33 days.

This patent is subject to a terminal disclaimer.

(21) Appl. No.: 14/541,324

(22) Filed: Nov. 14, 2014

(65) Prior Publication Data

US 2015/0069293 A1 Mar. 12, 2015

Related U.S. Application Data

(63) Continuation of application No. PCT/KR2013/005684, filed on Jun. 27, 2013.

(30) Foreign Application Priority Data

Jul. 9, 2012 (KR) .................. 10-2012-0074281

(51) Int. Cl.
*H01M 4/88* (2006.01)
*H01M 4/505* (2010.01)
*C01G 53/00* (2006.01)
*H01M 10/052* (2010.01)
*H01M 4/525* (2010.01)

(52) U.S. Cl.
CPC .......... *H01M 4/505* (2013.01); *C01G 53/006* (2013.01); *C01G 53/54* (2013.01); *C01P 2002/50* (2013.01); *C01P 2002/54* (2013.01); *H01M 4/525* (2013.01); *H01M 10/052* (2013.01); *H01M 2220/10* (2013.01); *H01M 2220/20* (2013.01); *Y02E 60/122* (2013.01)

(58) Field of Classification Search
CPC ...... C01D 15/02; H01M 4/131; H01M 4/1673
USPC ................. 252/500, 182.1; 429/219
See application file for complete search history.

(56) References Cited

U.S. PATENT DOCUMENTS 8,394,299 B2 * 3/2013 Shin ............... C01D 15/02
252/500
2003/0170540 A1 9/2003 Ohzuku et al.
2008/0160410 A1 7/2008 Sun et al.
2012/0012781 A1 1/2012 Chang et al.
2012/0043499 A1 2/2012 Shin et al.
2012/0045690 A1 2/2012 Xiang et al.
2012/0115047 A1 5/2012 Ma et al.
2013/0122363 A1 5/2013 Chang et al.
2013/0252104 A1* 9/2013 Jo .............. H01M 2/1673
429/219
2014/0356712 A1* 12/2014 Song ............ H01M 4/131
429/219

FOREIGN PATENT DOCUMENTS

| EP | 2261176 A1 | 12/2010 | |
|---|---|---|---|
| EP | 2445039 A2 | 4/2012 | |
| EP | 2871161 A1 | 5/2015 | |
| JP | H10228905 A | 8/1998 | |
| JP | H10228906 A | 8/1998 | |
| KR | 2006-0035547 A | 4/2006 | |
| KR | 20060046769 A | 5/2006 | |
| KR | 2009-0105868 A | 10/2009 | |
| KR | 20090105868 A | 10/2009 | |
| KR | 2011-0073630 A | 6/2011 | |
| KR | 20110121554 A | 11/2011 | |
| KR | 2012-0048245 A | 5/2012 | |
| KR | 2012-0061909 A | 6/2012 | |
| KR | 10-1159102 B1 | 7/2012 | |
| WO | WO 2013-048047 A2 * | 4/2013 | ............ H01M 4/131 |

OTHER PUBLICATIONS

International Search Report from PCT/KR2014/005684 dated Sep. 23, 2013.
J.-H. Kim et al., "Effect of Ti Substitution for Mn on the Structure of LiNi0.5Mn1.5-xTixO4 and Their Electrochemical Properties as Lithium Insertion Material." Journal of the Electrochemical Society, vol. 151, No. 11, Oct. 22, 2004, p. A1911.
G.B. Zhong, et al., "Structural, electrochemical and thermal stability investigations on LiNi0.5-xAl2xMn1.5-xO4 (0£2x£1.0) as 5V cathode materials," Journal of Power Sources, vol. 216, Jun. 6, 2012, pp. 368-375.
Tsutomo Ohzuku, et al., "Solid-state redox potentials for Li[Me1/2Mn3/2]O4 (Me: 3d-transition metal) having spinel-framework structures: a series of 5 volt materials for advanced lithium-ion batteries." Journal of Power Sources, Jan. 20, 2000, pp. 90-94.
Ting-Feng Yi, et al., "Recent developments in the doping of NiNi0.5Mn1.5O4 cathode material for 5 V lithium-ion batteries." Ionics, vol. 17, No. 5, Apr. 20, 2011, pp. 383-389.
J.-H. Kim, et al., "Comparative Study of LiNi0.5Mn1.5)4-s and LiNi0.5Mn1.5O4 Cathodes Having Two Crystallographic Structures: Fd3m and P4332." Chemistry of Materials, vol. 16, No. 5, Feb. 13, 2004.
Supplementary Search Report from European Application No. 13 81 7376, dated Sep. 3, 2015.

* cited by examiner

*Primary Examiner* — Khanh Tuan Nguyen
(74) *Attorney, Agent, or Firm* — Lerner, David, Littenberg, Krumholz & Mentlik, LLP

(57) ABSTRACT

Disclosed is a precursor for preparing a lithium composite transition metal oxide. More particularly, a transition metal precursor, including a composite transition metal compound represented by Formula 1 below, used to prepare a lithium transition metal oxide:

$$Ni_aM_bMn_{1-(a+b)}(O_{1-x})_2 \quad (1)$$

wherein M is at least one selected form the group consisting of Ti, Co, Al, Cu, Fe, Mg, B, Cr, Zr, Zn and Period II transition metals; and $0.2 \leq a \leq 0.25$, $0 \leq b \leq 0.1$, and $0 < x < 0.5$.

5 Claims, No Drawings

PRECURSOR FOR PREPARING OF LITHIUM COMPOSITE TRANSITION METAL OXIDE

CROSS-REFERENCE TO RELATED APPLICATIONS

The present application is a continuation of International Application No. PCT/KR2013/005684 filed Jun. 27, 2013, which claims priority from Korean Application No. 10-2012-0074281 filed Jul. 9, 2012, the disclosures of which are hereby incorporated herein by reference.

TECHNICAL FIELD

The present invention relates to a precursor for preparing a lithium composite transition metal oxide. More particularly, the present invention relates to a transition metal precursor used to prepare a lithium transition metal oxide, wherein the transition metal precursor includes a specific composite transition metal compound.

BACKGROUND ART

As mobile device technology continues to develop and demand therefor continues to increase, demand for secondary batteries as energy sources is rapidly increasing. Among these secondary batteries, much research has focused on lithium secondary batteries having high energy density and discharge voltage. Such batteries are commercially available and widely used.

Generally, as cathode active materials for lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among cathode active materials, $LiCoO_2$ is widely used due to excellent overall physical properties such as excellent cycle properties, and the like. However, $LiCoO_2$ is low in safety and expensive due to resource limitations of cobalt as a raw material. Lithium nickel based oxides such as $LiNiO_2$ are cheaper than $LiCoO_2$ and exhibit high discharge capacity when charged to a voltage of 4.25 V. However, lithium nickel based oxides have problems such as high production cost, swelling due to gas generation in batteries, low chemical stability, high pH and the like.

In addition, lithium manganese oxides, such as $LiMnO_2$, $LiMn_2O_4$, and the like, are advantageous in that they contain Mn, which is an abundant and environmentally friendly raw material, and thus are drawing much attention as a cathode active material that can replace $LiCoO_2$. In particular, among the lithium manganese oxides, $LiMn_2O_4$ has advantages such as a relatively cheap price, high output and the like. On the other hand, $LiMn_2O_4$ has lower energy density, when compared with $LiCoO_2$ and three component-based active materials.

To overcome these drawbacks, some Mn of $LiMn_2O_4$ is substituted with Ni and thereby $LiMn_2O_4$ has a higher potential (approximately 4.7 V) than original operating potential (approximately 4 V). Due to the high potential, a spinel material having a composition of $Li_{1+a}Ni_xMn_{2-x}O_{4-z}$ (0≤a≤0.1, 0.4≤x≤0.5, and 0≤z≤0.1) is well suited to use as a cathode active material of EVs, and medium and large lithium ion batteries requiring high energy and high-output performance. However, due to high charge and discharge voltage potential, there are a variety of problems, which must be solved, such as reduced battery performance caused by Mn dissolution of the cathode active material and side reaction of an electrolyte.

Meanwhile, in case of a lithium transition metal active material containing two or more materials such as Ni, Mn and the like, as described above, it is not easy to synthesize the lithium transition metal active material through a simple solid-phase reaction. Thus, as a precursor for preparing the lithium transition metal active material, use of a transition metal precursor prepared using a co-precipitation method or the like is known.

To solve the above problems and exhibit desired performance by preventing tap density reduction and optimizing a particle shape such as a globular shape or the like through control of a particle size or the like of such a transition metal precursor, by uniform precipitation, and the like, research into lithium transition metal oxides is underway.

A precursor having high tap density by controlling particle sizes and particle distribution may be synthesized, and a particle shape such as a globular shape may be optimized. Furthermore, the lithium composite transition metal oxide as described above may exhibit superior performance as a cathode active material However, despite such various tries, a precursor for preparing a lithium composite transition metal oxide having satisfactory performance and a lithium composite transition metal oxide obtained therefrom have yet to be developed.

DISCLOSURE

Technical Problem

The present invention aims to address the aforementioned problems of the related art and to achieve technical goals that have long been sought.

As a result of a variety of extensive and intensive studies and experiments, the inventors of the present invention developed a transition metal precursor including a specific composite transition metal compound, and confirmed that a secondary battery based on a lithium composite transition metal oxide prepared using the precursor exhibits superior high-speed charge characteristics, superior lifespan characteristics, and high charge and discharge efficiency, thus completing the present invention.

Technical Solution

In accordance with one aspect of the present invention, provided is a precursor for preparing a lithium composite transition metal oxide including a composite transition metal compound represented by Formula 1 below:

$$Ni_aM_bMn_{1-(a+b)}(OH_{1-x})_2 \quad (1)$$

wherein M is at least one selected form the group consisting of Ti, Co, Al, Cu, Fe, Mg, B, Cr, Zr, Zn and Period II transition metals; and 0.2≤a≤0.25, 0≤b≤0.1, and 0<x<0.5.

The composite transition metal compound according to the present invention precursor is characterized by including a large amount of Mn, a specific amount of Ni and other elements and by having a specific hydrate composition having an intermediate form of MeOOH and $Me(OH)_2$ which are generally known (where Me is, for example, Mn, Ni, Co, Fe or the like).

In particular, regarding the first property, the composite transition metal compound of Formula 1 is a composite transition metal compound of a spinel structure including a large amount of Mn and Ni substituted for some of the Mn or further including Ti, Al or the like, and thereby, a precursor including the composite transition metal compound may be preferably used, especially, in preparation of a cathode active material of a lithium secondary battery having superior high-speed charge characteristics.

Regarding the second property, an oxidation number of a transition metal of the composite transition metal compound is greater than +2 and is close to transition metal oxidation number +3 of a lithium composite transition metal oxide.

When a lithium composite transition metal oxide is prepared using the transition metal precursor, oxidation or reduction processes for change of oxidation number may be simplified and thereby superior process efficiency may be exhibited. In addition, a precursor having high tap density by controlling particle sizes and particle distribution may be synthesized, and a particle shape such as a globular shape may be optimized. Furthermore, the lithium composite transition metal oxide as described above may exhibit superior performance as a cathode active material.

Accordingly, due to a specific hydrate composition including a large amount of Mn, a specific amount of Ni and other elements, a lithium composite transition metal oxide having superior performance, which may not be expected in conventional lithium composite transition metal oxides, may be prepared.

In a specific embodiment, M may be Ti or Al.

In a specific embodiment, x may be particularly 0.2 or more and less than 0.5, more particularly 0.3 or more and less than 0.5.

In a specific embodiment, the transition metal precursor according to the present invention may include the composite transition metal compound particularly, in 30 wt % or more, more particularly in 50 wt % or more based on the total amount of the transition metal precursor. Besides the composite transition metal compound, the other materials constituting a precursor may be varied. For example, the other materials may be a composite transition metal hydroxide having an oxidation state of +2.

The transition metal precursor may be prepared into a lithium composite transition metal oxide having superior properties, when compared to a transition metal precursor not including the composite transition metal compound of Formula 1, as confirmed by Examples and Experimental Examples described below.

Hereinafter, a method of preparing the transition metal precursor according to the present invention will be described.

The transition metal precursor may be prepared using a transition metal-containing salt and an alkaline material through a co-precipitation method. Through the co-precipitation method, at least two transition metal elements are co-precipitated by precipitation reaction in an aqueous solution. In a specific embodiment, a composite transition metal compound including at least two transition metals may be prepared by mixing transition metal-containing salts in a desired molar ratio in consideration of the amounts of the transition metals to prepare an aqueous solution and then by performing co-precipitation while maintaining the resulting solution at alkaline pH by adding a strong base such as sodium hydroxide or the like and, if necessary, an additive such as ammonia or the like. Here, desired average particle diameter, particle diameter distribution and particle density may be adjusted by appropriately adjusting temperature, pH, reaction time, slurry concentration, ion concentration, and the like. In this regard, pH may be in the range of 9 to 13, for example, in the range of 9 to 12, and, in some cases, reaction may be performed in multiple stages.

As the transition metal-containing salt, a transition metal-containing salt having anions that are easily decomposed and volatilized during sintering is preferable. The transition metal-containing salt may be sulfates or nitrates. For example, the transition metal-containing salt may be nickel sulfate, titanium sulfate, manganese sulfate, nickel nitrate, titanium nitrate, manganese nitrate, or the like, but the present disclosure is not limited thereto.

In addition, the alkaline material may be sodium hydroxide, potassium hydroxide, lithium hydroxide or the like, preferably sodium hydroxide. However, the present disclosure is not limited thereto.

In one preferable embodiment, in the co-precipitating, an additive and/or alkali carbonate which may form a complex with a transition metal may be further added. The additive may be, for example, an ammonium ion source, ethylenediamine class compounds, citric acid class compounds or the like. The ammonium ion source may be, for example, aqueous ammonia, aqueous ammonium sulfate solution, aqueous ammonium nitrate solution or the like. The alkali carbonate may be selected from the group consisting of ammonium carbonate, sodium carbonate, potassium carbonate and lithium carbonate. In this case, as desired, two or more carbonates from the group may be selected and mixed.

Addition amounts of the additive and alkali carbonate may be properly determined considering the amount of the transition metal-containing salt, pH and the like. In accordance with reaction conditions, a transition metal precursor including only the composite transition metal compound according to Formula 1 may be prepared or a transition metal precursor further including other composite transition metal compounds may be prepared.

The present invention also provides a lithium composite transition metal oxide prepared using the transition metal precursor. In particular, a lithium composite transition metal oxide as a cathode active material for lithium secondary batteries may be prepared by sintering the transition metal precursor with a lithium-containing material.

In one specific embodiment, the lithium composite transition metal oxide may be a material represented by Formula 2 below.

$$Li_{1+a}Ni_bM_cMn_{2-(b+c)}O_{4-z} \quad (2)$$

Wherein M is at least one selected form the group consisting of Ti, Co, Al, Cu, Fe, Mg, B, Cr, Zr, Zn and Period II transition metals; and $0 \leq a \leq 0.1$, $0.4 \leq b \leq 0.5$, $0 \leq c \leq 0.1$ and $0 \leq z \leq 0.1$.

When the lithium composite transition metal oxide is $z>0$, the lithium composite transition metal oxide may be an oxygen-deficient structure.

The lithium-containing material, which is not specifically limited, may be, for example, lithium hydroxide, lithium carbonate, lithium oxide or the like. The lithium-containing material is preferably lithium carbonate ($Li_2CO_3$) and/or lithium hydroxide (LiOH).

The lithium composite transition metal oxide is preferably used as an electrode active material for lithium secondary batteries. The lithium composite transition metal oxide may be separately used or may be used by mixing with other publicly known electrode active materials for lithium secondary batteries.

Inventors of the present application confirmed that, when the lithium composite transition metal oxide prepared using the transition metal precursor is used as an electrode active material in a lithium secondary battery, the lithium secondary battery exhibits high-speed charge performance, superior lifespan characteristics, and superior charge and discharge efficiency.

Reaction conditions of the transition metal precursor and the lithium-containing material to prepare the lithium composite transition metal oxide are publicly known in the art. Therefore, detailed descriptions of the reaction conditions will be omitted in the specification.

The present invention also provides a cathode including the lithium composite transition metal oxide as a cathode active material and a lithium secondary battery including the same.

For example, the cathode is prepared by drying after coating a mixture of the cathode active material according to the present invention, a conductive material and a binder on a cathode current collector. In this case, as desired, the mixture may further include a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 20 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; and polyphenylene derivatives.

The binder is a component assisting in binding between an active material and the conductive material and in binding of the active material to a current collector. The binder is typically added in an amount of 1 to 20 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

Generally, the lithium secondary battery includes the cathode, an anode, a separator and a lithium salt-containing non-aqueous electrolyte. The other components of the lithium secondary battery according to the present invention will be described below.

The anode may be prepared by coating and drying an anode material on an anode current collector. As desired, the anode material may further include the above-described components.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and may be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

A lithium salt-containing non-aqueous electrolyte consists of a non-aqueous electrolyte and lithium. As the non-aqueous electrolyte, a non-aqueous electrolyte solution, a solid electrolyte or the like may be used.

Examples of the non-aqueous electrolyte solution include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.

The lithium salt is a material that is readily soluble in the non-aqueous electrolyte and examples thereof include, but are not limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas.

In addition, the present invention also provides a battery module including the lithium secondary battery as a unit battery and a battery pack including the battery module.

The battery pack may be used as a power source of medium and large devices that require high-temperature stability, long cycle characteristics, high rate characteristics, and the like.

Preferable examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the following examples. These examples are provided only for illustration of the present invention and should not be construed as limiting the scope and spirit of the present invention.

Example 1

After filling a 3 L wet reactor tank with 2 L of distilled water, nitrogen gas was continuously added to the tank at a rate of 1 L/min to remove dissolved oxygen. Here, the temperature of distilled water in the tank was maintained at 45 to 50 using a temperature maintenance device. In addition, the distilled water in the tank was stirred at 1000 to 1200 rpm using an impeller connected to a motor installed outside the tank.

Nickel sulfate, titanium sulfate and manganese sulfate were mixed in a ratio (molar ratio) of 0.25:0.04:0.71 to prepare a 2 M aqueous transition metal solution. Separately, a 4 M aqueous sodium hydroxide solution was prepared. The aqueous transition metal solution was continuously pumped into the wet reactor tank, using a metering pump, at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 10.5 to 11.0. In this regard, a 30% ammonia solution as an additive was continuously co-pumped to the reactor at a rate of 0.035 L/hr to 0.04 L/hr.

Flow rates of the aqueous transition metal solution, the aqueous sodium hydroxide solution and the ammonia solution were adjusted such that an average residence time of the solutions in the wet reactor tank was approximately 6 hours. After the reaction in the tank reached a steady state, reaction was allowed to proceed for a certain time to synthesize a composite transition metal precursor with a higher density.

After reaching the steady state, the nickel-titanium-manganese composite transition metal precursor, which was prepared by 20-hour continuous reaction of transition metal ions of the aqueous transition metal solution, hydroxide ions of the sodium hydroxide and ammonia ions of the ammonia solution, was continuously obtained through an overflow pipe installed on the top side of the tank.

The resulting composite transition metal precursor was washed several times with distilled water and dried in a 120° C. constant-temperature drying oven for 24 hours to obtain a nickel-titanium-manganese composite transition metal precursor of Ni$_{0.25}$Ti$_{0.04}$Mn$_{0.71}$(OH$_{1-x}$)$_2$.

Comparative Example 1

After filling a 3 L wet reactor tank with 2 L of distilled water, nitrogen gas was continuously added to the tank at a rate of 1 L/min to remove dissolved oxygen. Here, the temperature of distilled water in the tank was maintained at 40 to 45 using a temperature maintenance device. In addition, the distilled water in the tank was stirred at 1000 to 1200 rpm using an impeller connected to a motor installed outside the tank.

Nickel sulfate, titanium sulfate and manganese sulfate were mixed in a ratio (molar ratio) of 0.25:0.04:0.71 to prepare a 2.0 M aqueous transition metal solution. Separately, a 4 M aqueous sodium hydroxide solution was prepared. The aqueous transition metal solution was continuously pumped into the wet reactor tank, using a metering pump, at a rate of 0.18 L/hr. The aqueous sodium hydroxide solution was pumped in a rate-variable manner by a control unit for adjusting a pH of the distilled water in the tank such that the distilled water in the wet reactor tank was maintained at a pH of 9.5 to 10.0. In this regard, a 30% ammonia solution as an additive was continuously co-pumped to the reactor at a rate of 0.01 L/hr to 0.015 L/hr, resulting in a nickel-titanium-manganese composite transition metal precursor of Ni$_{0.25}$Ti$_{0.04}$Mn$_{0.71}$(OH)$_2$.

Experimental Example 1

Measurement of Average Oxidation Numbers of Transition Metals

Average oxidation numbers of the precursors prepared according to Example 1 and Comparative Example 1 were measured using an iodine titration method to calculate an average oxidation number after titrating the amount of iodine consumed during reduction of metal ions with a starch solution.

0.2 g of each of the transition metal precursors prepared according to Example 1 and Comparative Example 1 was dissolved for 1 hour in 50 ml of a potassium iodide solution and 25 ml of dilute sulfuric acid.

After dissolving the transition metal precursors, a starch solution was added to each of the resulting solutions to prepare brown or blue precursor solutions.

Each of the precursor solution was titrated with a sodium thiosulfate standard solution and then consumed amounts were measured to calculate an average oxidation number.

Results are summarized in Table 1 below.

TABLE 1

|  | Average oxidation number |
| --- | --- |
| Example 1 | 2.74 |
| Comparative Example 1 | 2 |

As shown in Table 1, it can be confirmed that each of the nickel-titanium-manganese composite transition metal precursors was precipitated having a proper oxidation number between an oxidation number of $M(OH)_2$ (oxidation number: +2) and an oxidation number of MOOH (oxidation number: +3), through a measurement result of a transition metal average oxidation number of each of the nickel-titanium-manganese composite transition metal precursors prepared according to Example 1 and Comparative Example 1.

Example 2 and Comparative Example 2

Manufacture of Coin Cells

Each of the nickel-manganese composite transition metal precursors prepared according to Example 1 and Comparative Example 1 was mixed with $Li_2CO_3$ in a ratio (molar ratio) of 1:1 and then sintered at 950° C. for 10 hours by heating at a heating rate of 5° C./min to prepare a cathode active material powder of $Li[Ni_{0.25}Ti_{0.04}Mn_{0.71}]_2O_4$.

The prepared cathode active material powder, Denka as a conductive material, and KF1100 as a binder were mixed in a weight ratio of 95:2.5:2.5 to prepare a slurry. The slurry was uniformly coated on Al foil having a thickness of 20 μm. The coated Al foil was dried at 130° C., thereby completing fabrication of a cathode for lithium secondary batteries.

The fabricated cathode for lithium secondary batteries, lithium metal foil as a counter electrode (i.e., an anode), a polyethylene membrane as a separator (Celgard, thickness: 20 nm), and a liquid electrolyte containing 1 M LiPF6 dissolved in a mixed solvent of ethylene carbonate, dimethylene carbonate, and diethyl carbonate in a volume ratio of 1:2:1 were used to manufacture a 2016 coin cell.

Experimental Example 2

Initial Charge and Discharge Characteristics

Charge and discharge characteristics of each of the coin cells prepared according to Example 2 and Comparative Example 2 were evaluated by charging and discharging once at a current of 0.1 C. Results are summarized in Table 2 below.

TABLE 2

|  | Initial charge capacity (mAh/g) | Initial discharge capacity (mAh/g) | Initial charge and discharge efficiency (%) |
| --- | --- | --- | --- |
| Example 2 | 147.2 | 141.8 | 96.3 |
| Comparative Example 2 | 147.3 | 138.6 | 94.1 |

As shown in Table 2, it can be confirmed that a lithium secondary battery including the lithium composite transition metal oxide prepared using the transition metal precursor according to the present invention as a cathode active material exhibits superior initial discharge characteristics and initial charge and discharge efficiency even in a condition of an identical composition, when compared to a lithium secondary battery according to Comparative Example 2 prepared using a $M(OH)_2$ precursor.

Experimental Example 3

High-Speed Charge Characteristics

High-speed charge characteristics of each of the coin cells prepared according to Example 2 and Comparative Example 2 were evaluated by charging at a current of 2.0 C after charging and discharging at a current of 0.1 C. Results are summarized in Table 3 below.

TABLE 3

|  | Charge capacity at 0.1 C (mAh/g) | Charge capacity at 2 C (mAh/g) | High-speed charge efficiency (%) |
| --- | --- | --- | --- |
| Example 2 | 147.2 | 146.5 | 99.5 |
| Comparative Example 2 | 147.3 | 142.3 | 96.6 |

As shown in Table 3, it can be confirmed that a lithium secondary battery including the lithium composite transition metal oxide prepared using the transition metal precursor according to the present invention as a cathode active material exhibits superior charge capacity and dramatically improved efficiency of almost 90% during high-speed charging, when compared to a lithium secondary battery according to Comparative Example 2 prepared using a $M(OH)_2$ precursor.

Experimental Example 4

Lifespan Characteristics

Lifespan characteristics of each of the coin cells prepared according to Example 2 and Comparative Example 2 were evaluated by charging and discharging fifty times at a current of 1.0 C. Results are summarized in Table 4 below.

TABLE 4

|  | Lifespan characteristics Discharge capacity (%) of $50^{th}/1^{st}$ |
| --- | --- |
| Example 2 | 97.2 |
| Comparative Example 2 | 84.6 |

As shown in Table 4, it can be confirmed that a lithium secondary battery including the lithium composite transition metal oxide prepared using the transition metal precursor according to the present invention as a cathode active material exhibits excellent lifespan characteristics showing discharge capacity exceeding 95%, when compared to a lithium secondary battery according to Comparative Example 2, having a discharge capacity value of 85% or less, prepared using a $M(OH)_2$ precursor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since an oxidation number of a transition metal precursor for preparing a lithium composite transition metal oxide according to the present invention is close to an oxidation number of a transition metal of a lithium composite transition metal oxide, when a lithium composite transition metal oxide is prepared using the transition metal precursor, an oxidation process or a reduction process for change of an oxidation number may be simplified and, as such, process efficiency may be high.

In addition, a precursor having high tap density by controlling particle sizes and particle distribution may be synthesized, a particle shape such as a globular shape may be optimized, and uniform precipitation is possible. Therefore, a lithium composite transition metal oxide prepared using the precursor may exhibit superior high-speed charge characteristics and lifespan characteristics, and may have high charge and discharge efficiency, as a cathode active material.

The invention claimed is:

1. A transition metal precursor for preparing a lithium composite transition metal oxide comprising a composite transition metal compound represented by Formula 1 below:

$$Ni_aM_bMn_{1-(a+b)}(OH_{1-x})_2 \quad (1)$$

wherein M is Ti;
$0.2 \le a \le 0.25$;
$0 \le b \le 0.1$; and
$0 < x < 0.5$.

2. The transition metal precursor according to claim 1, wherein x is 0.2 or more and less than 0.5.

3. The transition metal precursor according to claim 1, wherein x is 0.3 or more and less than 0.5.

4. The transition metal precursor according to claim 1, comprising the composite transition metal compound in an amount of 30 wt % or more based on a total amount of the transition metal precursor.

5. The transition metal precursor according to claim 4, comprising the composite transition metal compound in an amount of 50 wt % or more.

* * * * *